United States Patent Office 3,338,848
Patented Aug. 29, 1967

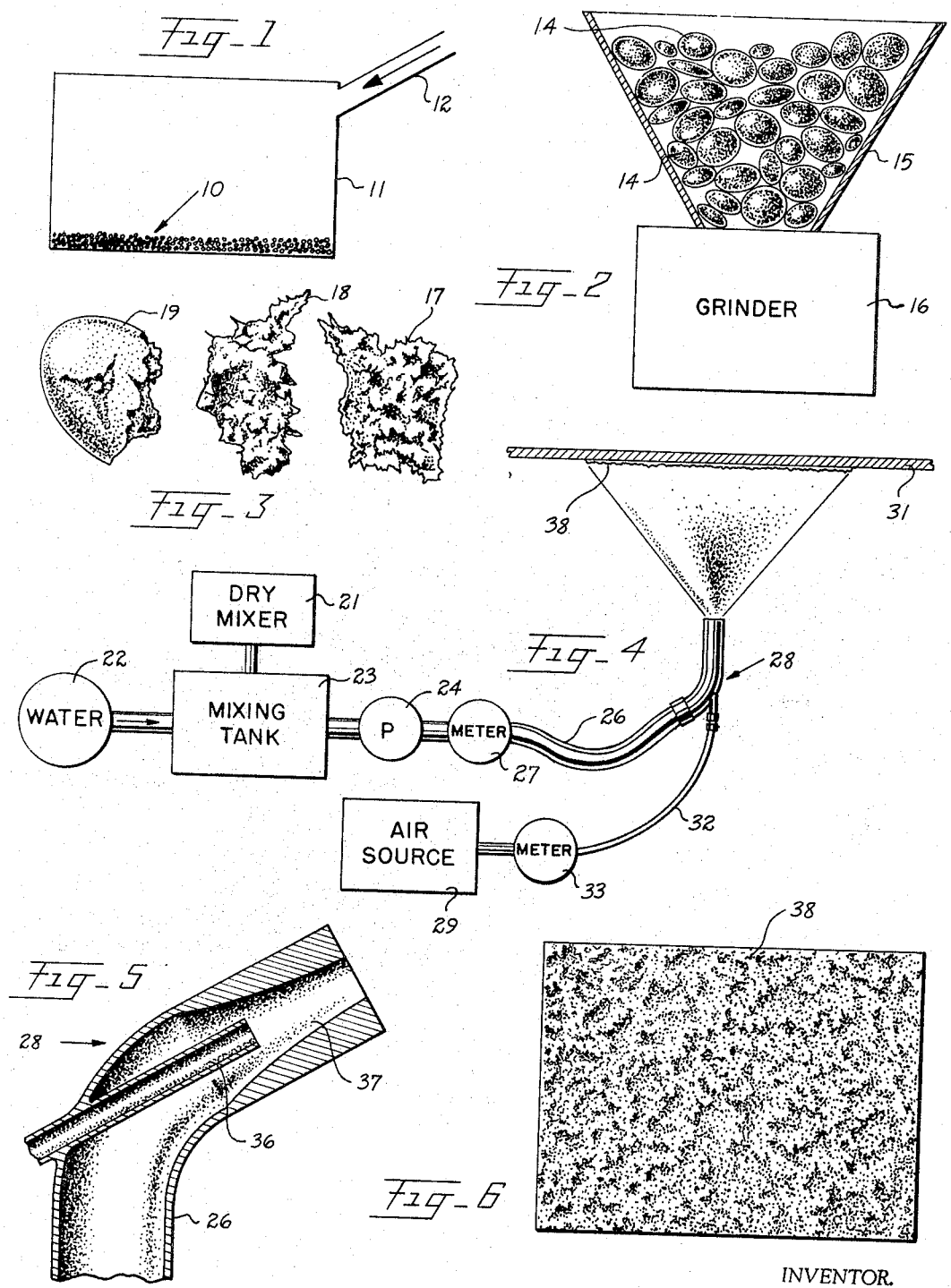

3,338,848
ADHERENT ACOUSTICAL AND DECORATIVE COATING COMPOSITION
Willis D. Hamilton, 10021 Highcliff Drive, Santa Ana, Calif. 92705
Continuation of application Ser. No. 132,937, Aug. 21, 1961. This application Nov. 10, 1964, Ser. No. 411,186
1 Claim. (Cl. 260—2.5)

This application is a continuation of my copending application, Ser. No. 132,937, filed Aug. 21, 1961, now abandoned for Coating Composition, and Method of Coating Therewith.

This invention relates to a coating composition adapted to be applied to ceilings as well as to other surfaces. The invention also relates to a method of making such coating composition, and to a method of effecting coating of such composition onto a surface.

An object of the invention is to provide a coating composition, and method of coating, which produce a decorative coating characterized by a high degree of sound absorptiveness and heat insulation.

A further object is to provide a coating composition which is economical and is simple to apply, and which may be readily and economically stored and transported.

A further object is to provide a method of manufacturing such coating composition.

These and other objects and advantages of the invention will be more fully set forth in the following specification and claims, considered in connection with the attached drawing to which they relate.

In the drawing:

FIGURE 1 is a view schematically illustrating the expansion of plastic beads to partially prepare them for use in the coating composition of the invention;

FIGURE 2 is a view schematically illustrating the shredding, grinding or milling of the expanded beads;

FIGURE 3 is an elevational view illustrating, in enlarged form, particles of fluff resulting from the step indicated in FIGURE 2;

FIGURE 4 is a view schematically illustrating the mixing of the coating composition to form an aqueous slurry, and the application thereof to a ceiling;

FIGURE 5 is a fragmentary sectional view illustrating a suitable nozzle adapted to apply the composition to a ceiling; and FIGURE 6 is a plan view of the ceiling having the coating applied thereto.

The first and essential base ingredient of the present invention is an expanded resin bead having very fine pores and characterized by a substantial degree of resilience. More specifically, the beads are formed by expanding thermoplastic substances (such as polystyrene) which contain non-dissolving or only swelling organic volatile liquids in homogeneous dispersion therein. Expansion is effected by heating the beads in an unconfined space to a temperature above the boiling point of the liquid raising agent.

Beads suitable for use in the present invention are produced under United States Patents 2,681,321, issued June 15, 1954, for Production of Porous Materials From Film-Forming Organic Thermoplastic Masses; 2,950,261, issued Aug. 23, 1960, for Process of Making Expansible Particulate Styrene Polymer by Diffusion of a Volatile Liquid Hydrocarbon Into Said Polymer Particles; and 2,744,291, issued May 8, 1956, for Production of Porous Shaped Articles From Thermoplastic Materials. With relation to the latter patent, it is pointed out that in the present invention there is no confining of the beads so that the beads are loose and are not in a coherent mass. The plastic beads, when fully expanded as will be described, may range in size from about ⅜ inch down to about ⅛ inch. The beads described in such patents are formed of synthetic or artificial resin, such as a styrene polymer.

The expanded beads are fragmented by grinding, milling or shredding to form what may be termed a fluff. The fragments, to be described below, may each have a diameter on the order of ⅛ inch.

The second ingredient of the composition is a suitable water-soluble binder or binding agent, which also serves as a particle stabilizer. This may comprise, for example, carboxy ethyl cellulose, casein, or suitable polyvinyl acetates or alcohols.

The third ingredient is a filler, which may be termed a base filler. The filler should be opaque when dry and is adapted to coat the plastic fluff. A suitable filler is talc, such as minus 325 mesh. Various fine clays, and calcium carbonate, are other examples of fillers which may be employed.

A fourth ingredient is a short fiber, for example asbestos fibers approximately ¼ inch in length. Various other fibers, such as glass fibers or cotton fibers, may also be utilized. Such fibers operate to tie down the fluff, cooperating with the binder to cause the resulting coating to be coherent and long-lasting.

The fifth ingredient is a pigment, such as titanium dioxide, adapted to impart the requisite color to the resulting coating. The titanium dioxide cooperates with the shredded plastic beads to produce a high degree of whiteness. It is to be understood that colors other than white may also be used.

A sixth ingredient is a suitable clay, for example a Wyoming clay, which imparts slip and thixotropic characteristics to the coating mixture. The clay aids in forming a satisfactory slurry, and lessens the drag or friction in the hose through which the mixture is pumped as it is applied to the ceiling or other surface. The clay also aids in effecting dispersion of the slurry at the nozzle.

It is to be understood that other ingredients may also be utilized, in small amounts. For example, when the binding agent is casein a suitable alkali may be employed to aid in putting the casein into aqueous solution. Also, a stabilizer (such as hydroxy methyl cellulose) may be employed to prevent the pigment particles from settling during shipment and storage of the composition, it being understood that the composition is normally shipped and stored dry and then mixed with water at the job site. Also where casein is employed, a preservative, namely a suitable anti-bacterial agent, is utilized to prevent the casein from putrefying.

Referring to the drawing, FIGURE 1 illustrates a mass of unexpanded beads 10 disposed in a chamber 11, the latter being sufficiently large that there will be no confining of the beads even after the same have been fully expanded. The beads may be expanded by admitting steam through an inlet 12.

The fully-expanded loose beads are indicated at 14 in FIGURE 2 as comprising oblate spheroids the major diameters of which are approximately in the range of ⅛–⅜ inch. It is to be understood, however, that different sizes may be employed.

FIGURE 2 shows the expanded beads 14 as located in the intake 15 of a suitable grinder, shredder or mill 16, such as a hammer mill. After they have been fragmented in the mill 16, the beads are irregularly shaped, having rough surfaces and numerous jagged edges. Several particles of shredded bead (fluff) are indicated at 17 and 18 in FIGURE 3, having (as previously indicated) diameters on the order of ⅛ inch. Illustrated at 19 in FIGURE 3 is an expanded bead 14, for example one having a relatively small diameter, which is only partially shredded or fluffed. It is pointed out, however, that even in the case of a very small bead the surface is nicked and damaged for purposes including improved adherence to the binder, and improved properties and appearance of the finished coating. Thus, relative to the fragments 17–19, it is pointed out that the interiors of the beads 14 are exposed.

Referring next to schematic FIGURE 4, a dry mixer is indicated at 21 and a suitable source of water at 22. The above-indicated ingredients are dry-mixed in mixer 21 and are introduced, along with the necessary amount of water, into a mixing tank 23 wherein a slurry is formed. A pump 24 is emloyed to pump such slurry through a conduit 26 and meter 27 to a nozzle 28. Pump 24 cooperates with a source of compressed air (indicated at 29) to apply the slurry in atomized form onto a ceiling (or other surface to be coated) which is schematically indicated at 31. The air from source 29 passes through an air hose 32 and an associated control or meter 33.

As previously implied, the mixed dry ingredients may be stored for long periods of time, or may be shipped long distances, before they are mixed with water.

Referring to FIGURE 5, a suitable nozzle 28 effects introduction of air from hose 32 at the axis of the conduit 26, the end 36 of the air hose being rigid. The end of the slurry conduit 26 converges forwardly of air-hose end 36, as shown at 37. In a typical nozzle, the diameter of the end portion 36 of the air hose may be ¼ inch, and the diameter of the narrow end of convergent portion 37 may be ⅝ inch.

The air pressure and rate of air flow are adapted to effect atomization of the slurry. For example, this may be accomplished by delivering air through a one-quarter inch hose with an air pressure (at the hose end 36) of 80 p.s.i.g. The result of the method is a coating 38 (FIGURE 6) which, as above stated, is characterized by substantial sound-absorbing and heat-insulating properties as well as by a high degree of beauty and whiteness.

The rate of feeding of water and dry ingredients into mixing tank 23 may be such that approximately ten gallons of water are employed for each thirty-five pounds of dry ingredients, that is to say approximately 0.3 gallon of water per pound of dry ingredients. The proportions of the dry ingredients will next be set forth in detail. All of the proportions, relative to the dry ingredients, are given by weight.

The above-described fragmented beads (fluff) may comprise between about 5% and about 20% of the dry ingredients, the above-described binder may comprise between about 0.5% and about 10% thereof, the above-described filler may comprise between about 50% and about 90% thereof, the fiber may comprise between about 0.5% and about 20% thereof, the pigment may comprise between about 0.5% and about 20% thereof, and the clay may comprise between about 0.5% and about 20% thereof. In addition, as previously indicated, small percentages of stabilizer, etc., may be employed. Such mixed dry ingredients are, as described above in detail, mixed with water, at the above-indicated rate of about 0.3 gallon water per pound mixed dry ingredients, and applied as stated heretofore.

The following are several specific examples of the dry ingredients, it being understood that these are mixed with water and applied as set forth in detail above:

(1) Fluff 8%, binder 1.5%, filler 84%, fiber 1%, pigment 2.5%, and clay 3%. More specifically, the binder is carboxy ethyl cellulose, the filler is talc (minus 325 mesh), the fiber is asbestos (¼ inch), the pigment titanium dioxide, and the clay a Wyoming clay (minus 200 mesh powder).

(2) Casein 1.6%, alkali 0.48%, hydroxy methyl cellulose 0.4%, Wyoming clay 1.6%, anti-bacterial agent for the casein 0.48%, talc (minus 325 mesh) 45%, calcium carbonate 27%, asbestos 1%, titanium dioxide 14.44% and shredded expanded bead fluff (as described above) 8%.

Various embodiments of the present invention, in addition to what has been illustrated and described in detail may be employed without departing from the scope of the accompanying claim.

I claim:

An adherent acoustical and decorative coating composition adapted to be stored dry and thereafter mixed with water for spray application onto substrates such as ceilings and the like, which comprises:
   a water-soluble binder,
   a particulate filler,
   a lightweight resilient aggregate imparting to the coating composition improved decorativeness and sound-absorbing capability,
      said aggregate consisting essentially of discrete, resilient fragments of substantially fully-expanded polystyrene beads,
         said fragments being irregular in that each fragment is shaped differently from substantially all other fragments,
         said fragments being non-spheroidal, said fragments having sharp and jagged edge portions adapted to improve the adherence of the fragments to remaining portions of the coating composition and to the substrate onto which the coating composition is applied,
   a short fiber,
   a pigment, and
   a clay,
      said dry ingredients of the coating composition being present in about the following percentages by weight:
         about 0.5% to about 10% binder,
         about 50% to about 90% filler,
         up to about 20% aggregate,
         about 0.5% to about 20% fiber,
         about 0.5% to about 20% pigment,
         about 0.5% to about 20% clay.

References Cited

UNITED STATES PATENTS

| 2,610,923 | 9/1952 | Taylor | 106—193 |
| 2,640,791 | 6/1953 | Barber | 106—193 |
| 2,699,401 | 1/1955 | Grossi | 106—193 |
| 2,744,291 | 5/1956 | Stastny et al. | 260—2.5 |
| 2,779,689 | 1/1957 | Reis | 260—2.5 |
| 2,838,801 | 6/1958 | DeLong et al. | 264—53 |
| 2,993,016 | 7/1961 | Sucetti | 106—193 |
| 3,023,136 | 2/1962 | Himmelheber et al. | 264—53 |
| 3,080,612 | 3/1963 | Buchmann | 264—51 |

SAMUEL H. BLECH, *Primary Examiner.*

MURRAY TILLMAN, GEORGE F. LESMES,
*Examiners.*

M. FOELAK, *Assistant Examiner.*